United States Patent [19]

Sowell

[11] Patent Number: 4,494,921
[45] Date of Patent: Jan. 22, 1985

[54] FILTER ELEMENT

[75] Inventor: Lyles H. Sowell, Old Hickory, Tenn.

[73] Assignee: E. I. Du Pont de Nemours and Company, Wilmington, Del.

[21] Appl. No.: 521,422

[22] Filed: Aug. 8, 1983

[51] Int. Cl.³ .............................................. B29F 3/04
[52] U.S. Cl. ................................ 425/198; 264/176 F; 425/72 S
[58] Field of Search ............ 264/176 F; 425/464, 425/382.2, 197–199

[56] References Cited

U.S. PATENT DOCUMENTS

| | | | |
|---|---|---|---|
| 2,266,363 | 12/1941 | Graves | 425/198 |
| 3,044,628 | 7/1962 | Heijnis | 425/198 |
| 3,259,938 | 7/1966 | Martin . | |
| 3,299,472 | 1/1967 | Martin . | |
| 3,570,059 | 3/1971 | Mott . | |
| 3,630,384 | 12/1971 | Toda . | |
| 3,728,061 | 4/1973 | Mott . | |
| 3,737,036 | 6/1973 | Kasten . | |
| 3,847,524 | 11/1974 | Mott . | |
| 3,896,028 | 7/1975 | Phillips . | |
| 3,938,925 | 2/1976 | Lees . | |
| 4,126,560 | 11/1978 | Marcus et al. . | |
| 4,405,548 | 9/1983 | Cobb | 264/176 F |

FOREIGN PATENT DOCUMENTS

| | | | |
|---|---|---|---|
| 145547 | 12/1980 | Fed. Rep. of Germany . | |
| 48-28967 | 9/1973 | Japan | 264/176 F |
| 48-28968 | 9/1973 | Japan | 264/176 F |
| 1171735 | 11/1969 | United Kingdom | 425/198 |

*Primary Examiner*—Jay H. Woo
*Assistant Examiner*—J. L. Fortenberry

[57] ABSTRACT

A spinneret assembly which includes a filter bed holder containing a filter element. The filter element increases in porosity from its center to its periphery.

6 Claims, 3 Drawing Figures

FILTER ELEMENT

BACKGROUND OF THE INVENTION

This invention relates to the production of yarns, filaments, ribbons and the like from synthetic linear polymers and more particularly to improvements in the assembly from which such articles are spun.

It is customary to filter a synthetic filament forming composition before extruding it through a spinneret assembly which includes a holder filled with a filtering medium. One filtering medium which maintains a high degree of porosity under an applied load is a metal alloy such as disclosed by Phillips in U.S. Pat. No. 3,896,028. The alloy disclosed by Phillips which consists of 30 to 40% by weight chromium, 2 to 4% by weight silicon, minor amounts, at ordinary levels of carbon and nitrogen with the remainder being iron is a particulate filter medium in which the particles are irregularly shaped with a rough surface. While this material provides high levels of some of the properties of an ideal filter medium certain polymer additives in the polymer cause high pack blinding rates which in turn limit pack life.

SUMMARY OF THE INVENTION

According to the present invention, spinning pack life is improved by using a spinneret assembly which includes a filter bed holder, parts for clamping the holder to a molten polymer supply for feeding molten polymer through the holder in one direction to be spun as filaments and a filter bed in the holder. The filter bed comprises a layer of compressed formable powdered metal that has a porosity that increases from the center of the layer to its periphery in a direction substantially normal to the polymer flow, as a consequence the velocity of the polymer flow near the periphery of the filter bed is higher than at the center which reduces polymer degradation to lengthen the life of the filter.

DETAILED DESCRIPTION OF THE ILLUSTRATED EMBODIMENT

Figure 1:
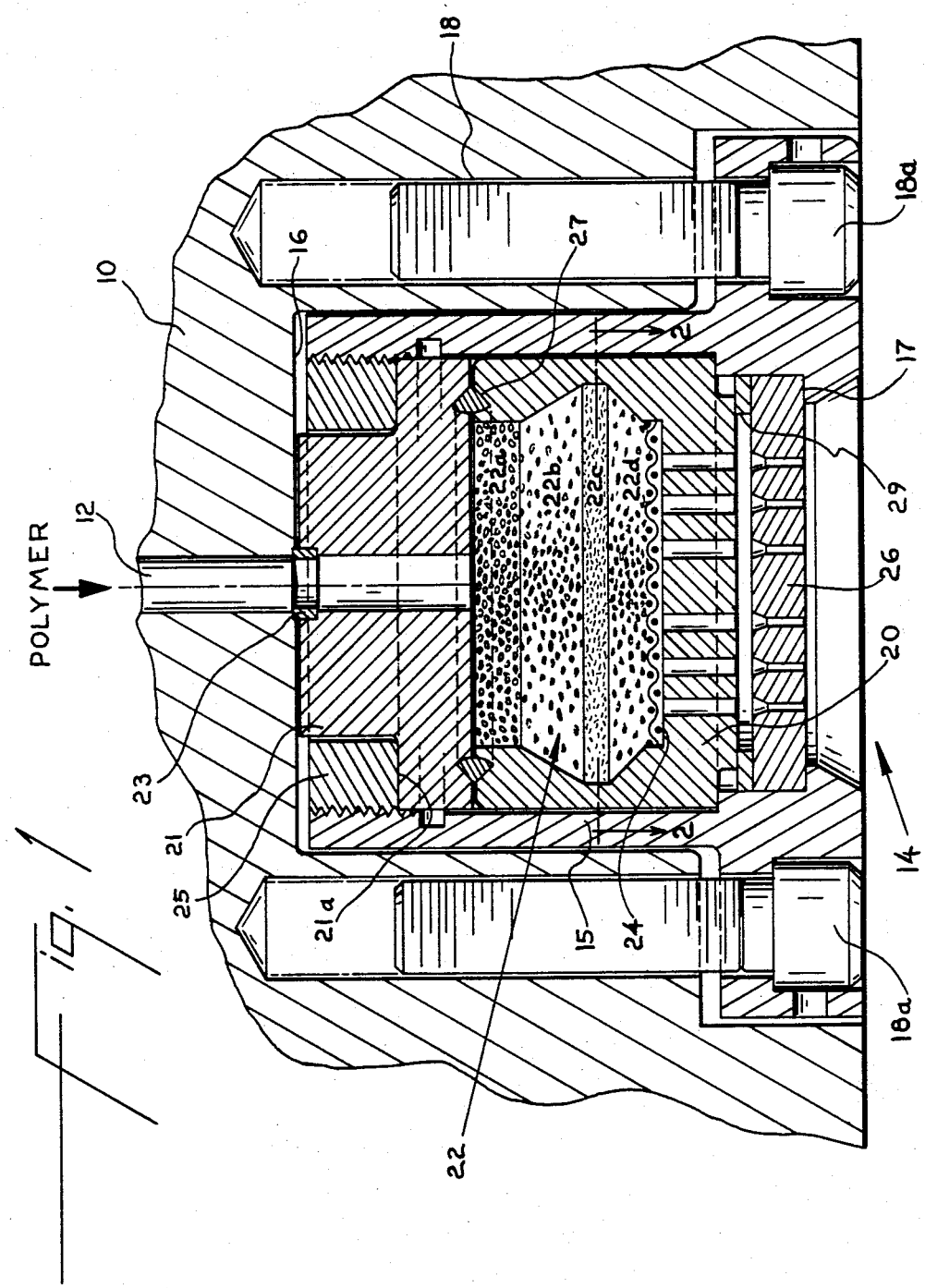
FIG. 1 is a fragmentary view of a spinning machine and an operably associated spinneret assembly.

In FIG. 1, the base portion of a spinning machine is represented by the numeral 10 and has a supply port 12 in communication with a pump or other suitable metering device (not shown) by which molten polymer to be spun is brought to a spinneret assembly generally designated 14. As shown base 10 has a cavity defined by a stepped cylindrical side wall, an upper surface 16 and a plurality of threaded holes 18 with bolts 18a which support assembly 14.

As a component of assembly 14, a cylindrical pack holder 15 contains a filter bed holder 20 which defines a chamber in which a filter bed 22 in the form of a plurality of layers 22a, 22b, 22c and 22d, of compressed formable powdered metal rest on a flat screen 24. A spinneret plate 26 rests on internal shoulder 17 of the pack holder 15 below the filter bed holder 20. In assembly, the filter bed holder 20 and the spinneret 26 are held in place in the pack holder 15 by means of a pack cap 21 having a gasket 23 in its top surface held against the top surface of filter bed holder 20 by lock nut 25 threaded internally to pack holder 15 and engaging shoulder 21a of pack cap 21.

By means of gaskets 27, 29 sealed points are maintained between the filter bed holder 20 and pack cap 21 and spinneret 26 respectively. Gasket 23 in the top surface of pack cap 21 provides a sealed joint between supply part 12 and the spinneret assembly when bolts 18a are tightened to force pack holder 15 and the gasket 23 against surface 16. The filter bed 22 make up procedure includes the following steps:

1. install screen 24;
2. install layer 22d (10/25 mesh powdered metal) and tamp in place;
3. install layer 22c (50/70 mesh powdered metal) and tamp in place;
4. install layer 22b (10/25 mesh powdered metal) and tamp in place;
5. press layers 22b, 22c, 22d to ten (10) tons at room temperature using a press tool slightly smaller than the diameter of the opening into the filter bed holder; and
6. fill the remainder of the filter bed holder with #10 coarse aluminum chips and tamp in place (22a).

Figure 2:
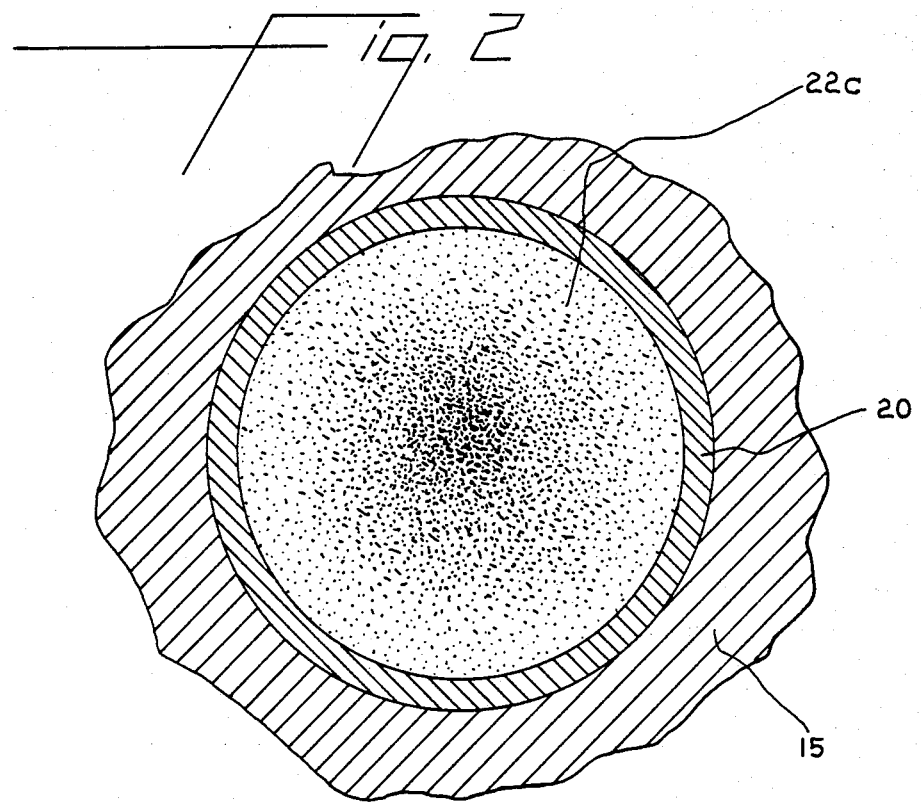
FIG. 2 is a section view of FIG. 1 taken along line 2—2 showing a cross section of the filter bed element that is normal to the direction of polymer flow.
Figure 3:
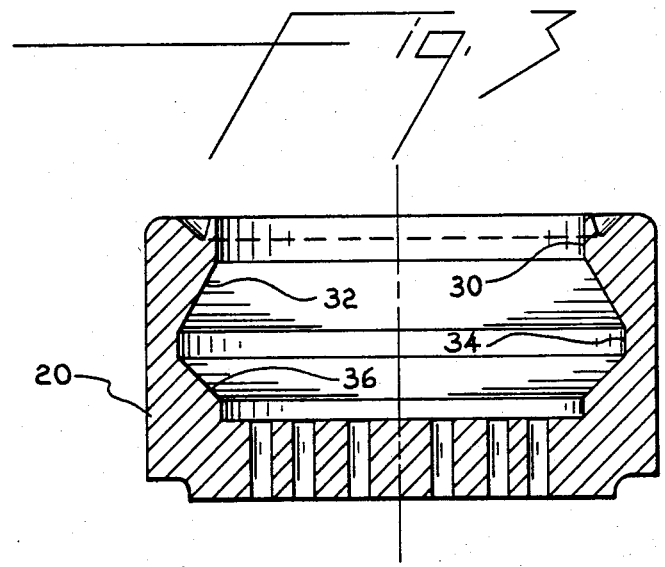
FIG. 3 is a view of the filter bed holder shown in FIG. 1 detailing the construction of the holder.

As shown in FIG. 3, the chamber within the filter bed holder 20 is defined from top to bottom by the following successive lengths: a straight length 30, an outwardly tapered length 32, a straight length 34 and an inwardly tapered length 36. Not only does this configuration yield additional filter surface area at the interface between layers 22b, 22c and 22d but also a powdered metal porosity profile is created during the compaction step of the filter bed make up. More particularly, the powdered metal occupying the bored out section, or lengths 32, 34 and 36 of the filter bed holder, is not subjected to the full press force (only lateral forces) creating a filter with radially increasing porosity as shown in FIG. 2 wherein the particles of layer 22c are shown to represent increasing porosity in layer 22c from its center to its peripheral edge.

In a series of test runs using the spinneret pack assembly described above, the pack life was approximately doubled and the packs were characterized by lower startup pressures and reduced rates of pressure build-up. The product was judged equivalent to prior art spinning packs.

I claim:

1. A layered filter bed element for removing contaminants from a molten fluid polymer stream flowing through the layer in a direction substantially normal to the layers, said filter bed element comprising: a compressed layer of formable powdered metal defined by a peripheral edge, said layer having a porosity that increases from its center toward its periphery.

2. The filter bed element of claim 1, said layer having a circular shape, said porosity increasing in a radial direction.

3. The filter bed element of claim 1 or claim 2, said powdered metal being formed from a metal alloy comprising chromium, silicon and iron.

4. A spinneret assembly including a filter bed holder, said holder having a chamber defined from top to bottom by a first straight length, an outwardly tapered length, a second straight length and an inwardly tapered length; parts for clamping the holder to a molten polymer supply for feeding molten polymer in one direction through the holder to be spun as filaments; and a filter bed compressed in said chamber of said holder, said filter bed comprising a layer of formable powdered metal having a porosity that increases from its center to its periphery, said polymer flowing substantially normal to said layer.

5. The spinneret of claim 4, said filter bed having a circular shape, said porosity increasing in a radial direction.

6. The spinneret of claim 4 or claim 5, said powdered metal being formed from a metal alloy, said alloy consisting essentially of about 30 to about 40 percent by weight chromium, about 2 to about 4 percent by weight silicon, minor amounts of carbon and nitrogen and the remainder iron.

* * * * *